Aug. 13, 1946.                C. H. BATTERMAN                2,405,634
                    LEVEL INDICATOR FOR CONTOUR PLOWING
                    Filed Feb. 27, 1945         2 Sheets-Sheet 1
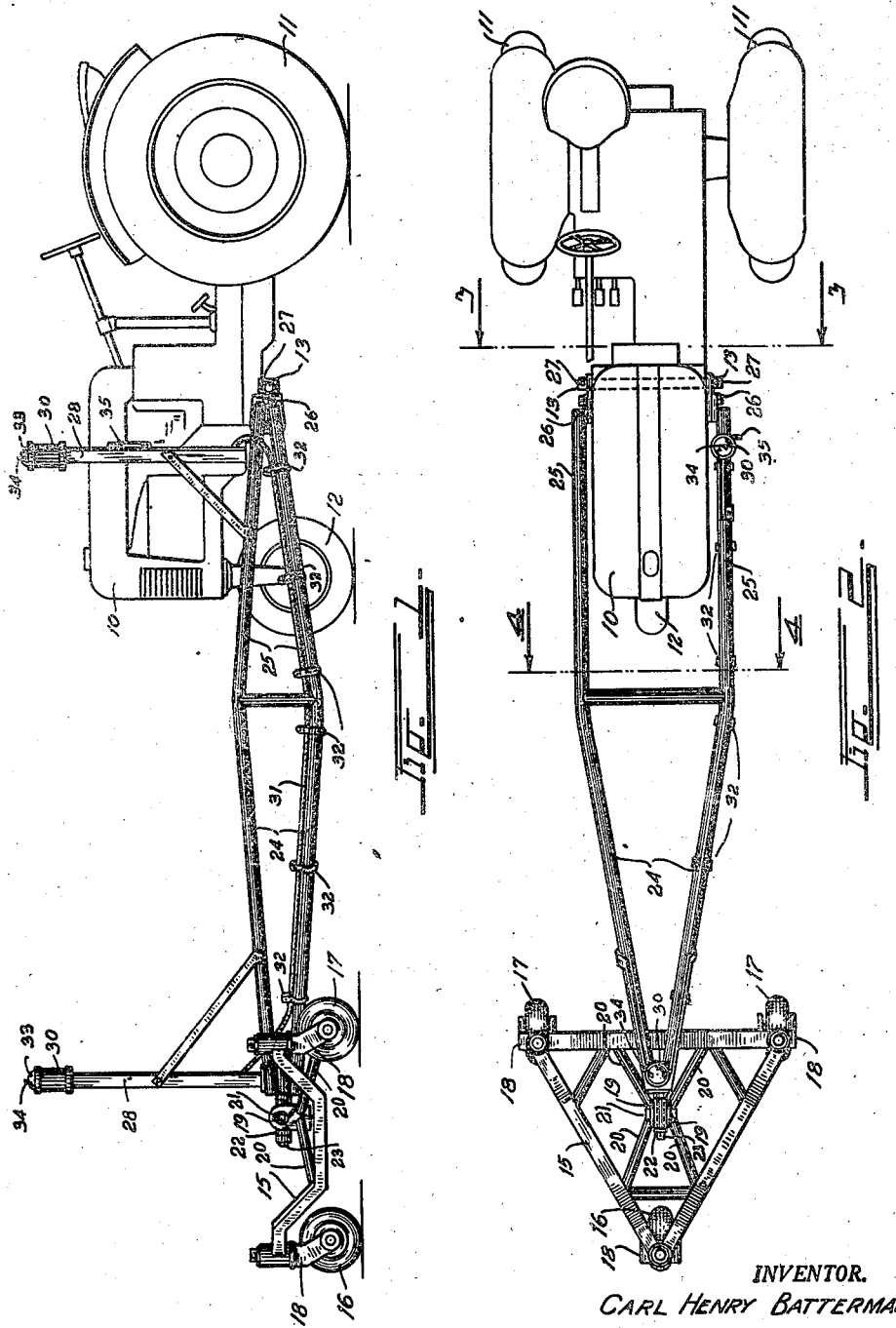
INVENTOR.
CARL HENRY BATTERMAN.
BY
ATTORNEY.

Aug. 13, 1946.     C. H. BATTERMAN     2,405,634
LEVEL INDICATOR FOR CONTOUR PLOWING
Filed Feb. 27, 1945     2 Sheets-Sheet 2
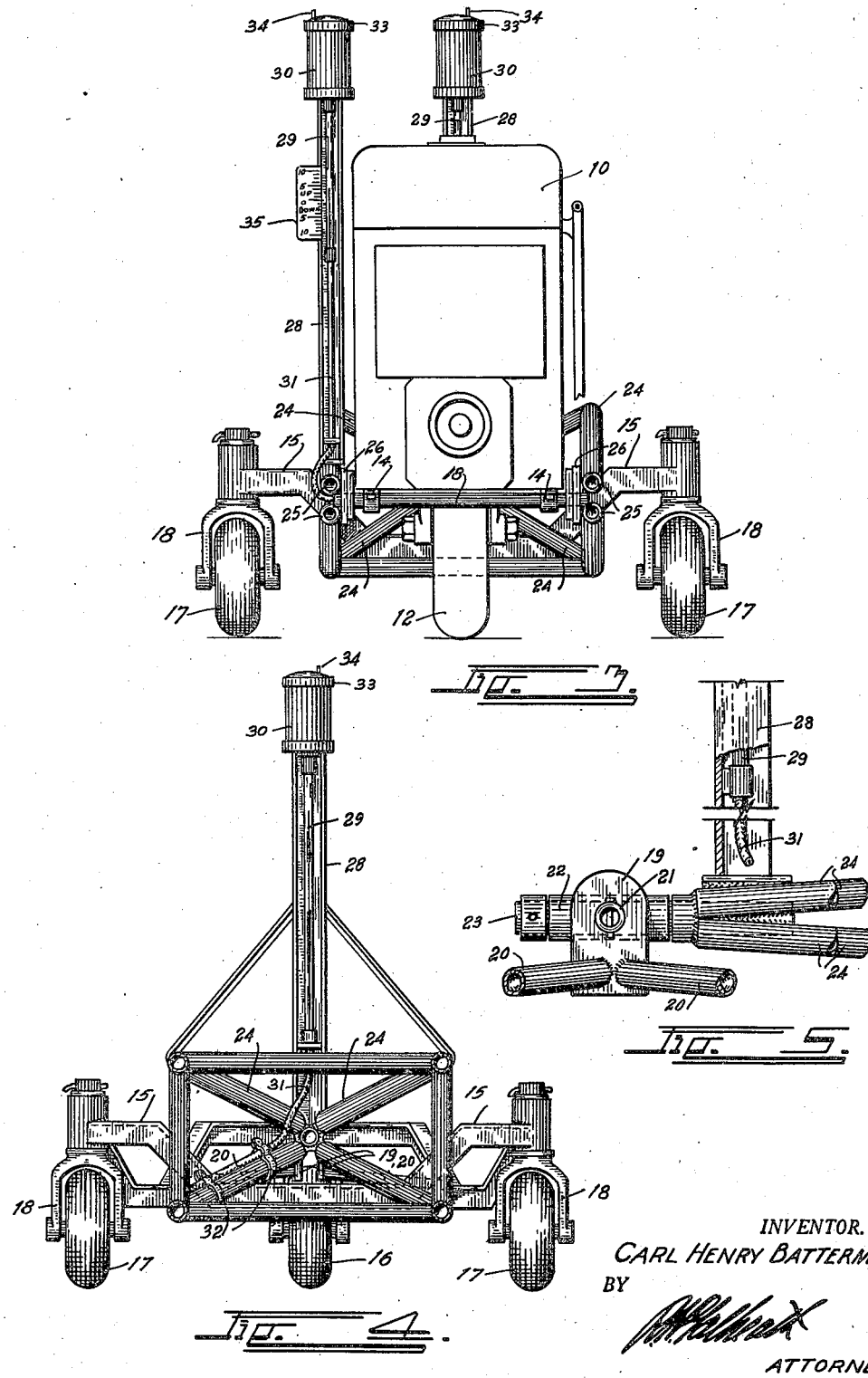
INVENTOR.
CARL HENRY BATTERMAN.
BY
ATTORNEY.

Patented Aug. 13, 1946

2,405,634

UNITED STATES PATENT OFFICE 2,405,634

LEVEL INDICATOR FOR CONTOUR PLOWING

Carl Henry Batterman, Gering, Nebr.

Application February 27, 1945, Serial No. 579,933

3 Claims. (Cl. 33—209)

This invention relates to a level indicator for contour plowing, and has for its principal object the provision of an attachment which will precede the tractor and provide a relatively long leveling base whereby a very accurate indication of the level or incline of the ground may be had.

A further object is to so construct the device that it will not be affected by small surface irregularities, such as furrows, ditches, washes, etc.

Level indicators have been used consisting of an instrument placed on the instrument board of the tractor, or upon some other portion thereof close to the driver whereby he will be informed of the grade upon which the tractor is traveling. These have not been satisfactory due to the fact that the tractor itself is constantly tilting up or down due to slight irregularities in the ground surface.

It is an object of the present invention to provide a long leveling base for the instrument which will be independent of the tilt or incline of the tractor, and which will give an average indication of all ground irregularities.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a side view of the improved level indicator, illustrating it in place on a typical farm tractor;

Fig. 2 is a plan view thereof;

Fig. 3 is an enlarged cross-section taken on the line 3—3, Fig. 2;

Fig. 4 is a similarly enlarged cross-section taken on the line 4—4, Fig. 2; and

Fig. 5 is a detail fragmentary view illustrating the universal hinge employed in the device.

In the drawings, a typical farm tractor is indicated at 10, with its rear wheels at 11 and the front wheels at 12. A pivot shaft 13 is secured beneath the tractor 10 transversely of the axis thereof. This shaft may be attached to the tractor in any desired manner and may, if desired, remain permanently in place thereon. As illustrated, it is attached by means of attachment clips 14 bolted or otherwise secured beneath the tractor.

The attachment comprises triangular truck 15 supported upon a lead caster wheel 16 and two follower caster wheels 17, each wheel being mounted in a rotatable wheel bracket 18 at one of the corners of the triangular frame 15. Two upstanding parallel hinge ears 19 are supported above the middle of the truck 15 by means of suitable cross braces 20. A hinge pin 21 passes through the ears and connects them to a universal sleeve 22, the sleeve being free to rock in a vertical plane with respect to the ears 19.

The sleeve 22 is rotatably mounted on a stub shaft 23, which projects rigidly forward from a truss frame 24. The truss frame is preferably formed from tubular members, such as metal pipe or tubing, and widens out as it extends rearwardly from the stub shaft 23, terminating in two spaced-apart arm portions 25 which extend on each side of the tractor 10. Each of the arm portions terminates in an attachment plate 26, through which the extremities of the shaft 13 pass, and which may be locked on the latter extremities by means of suitable cotter keys 27.

The stub shaft 23 and the ears 19 are so arranged as to maintain the lead wheel 16 accurately in alignment with the axis of the tractor 10. It will be noted, however, that the truck 15 is free to tilt in every direction due to the fact that the hinge pin 21 and the stub shaft 23 provide a universal mounting.

Two upstanding posts 28 are mounted on the truss frame 24, one of the posts being mounted as near the stub shaft 23 as possible, the other being mounted at the rearward extremity of one of the arms 24. A glass tube 29 is supported by each of the posts, terminating in its upper extremity in an overflow chamber 30.

The lower extremity of each tube 29 is connected to a suitable fluid conduit, such as a hose for pipe 31, extending the length of the truss frame 24 along the lower members thereof. The conduit 31 may be attached to the frame in any desired manner, such as by means of clamps 32. Each of the chambers 30 is closed by means of a sealing cap 33 having a relatively small air vent 34. The tubes 29 in combination with the connecting conduit 31 form a typical fluid U-tube for detecting levels or grades.

An indicating scale 35 is mounted on the post 28 nearest the driver. The tubes 29 and the pipe 31 are filled with fluid to a point which will allow the fluid level in the tubes to rise to the "zero" indication on the scale 35 when the tractor and the truck 15 are resting upon perfectly level ground.

In use, the tractor is driven along the path of the desired furrow, with the truck 15 preceding the tractor. Should the truck rise to a higher elevation than the tractor, the fluid in the U-tube will rise in the rear tube 29 to a point above the "zero" indication on the scale to immediately notify the operator that he is proceeding "uphill." He can then correct his course to swing the truck "downhill" until the fluid level returns to the "zero" indication. It will be noted that the course can be corrected before the plows reach the point of deviation so that the resulting furrow is at all times perfectly horizontal.

The air vents 34 are relatively small so as to allow only a gradual escape or intake of air. This exerts a dampening influence on the column of fluid so that it will not vacillate up and down due to small irregularities in the ground. The chambers 30 are for the purpose of receiving the overflow from the tubes should the device be subjected to a relatively steep incline.

It will be noted that the pivot shaft 13 is positioned approximately half way between the front wheel 12 and the rear wheels 11 of the tractor. Therefore, tilting movements of the tractor itself do not affect the elevation of the rear extremity of the truss member 24. This is also true of the truck 15, for the universal pivot thereon is positioned intermediate the three wheels so that tilting of the truck in any direction does not affect the elevation of the truss frame 24. The latter is only affected by a general difference in elevation between the truck 15 and the tractor 10.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A level indicator for tractors comprising: a horizontal pivot member on said tractor with its axis at right angles to the axis of said tractor; a truss frame hingedly mounted on said pivot member and extending forwardly of said tractor; a stub shaft at the forward extremity of said truss frame in axial alignment with said tractor; a wheeled truck rotatably mounted on said stub shaft supporting the forward extremity of said truss frame; and a liquid-containing U-tube carried by said truss frame for indicating the level thereof.

2. A level indicator for tractors comprising; a horizontal pivot member on said tractor with its axis at right angles to the axis of said tractor; a truss frame hingedly mounted on said pivot member and extending forwardly of said tractor; a stub shaft at the forward extremity of said truss frame in axial alignment with said tractor; a hinge member rotatably mounted on said stub shaft; a truck frame hingedly mounted on said hinge member so that it will be free to tilt in every direction; caster wheels supporting said truck frame; and a liquid-containing U-tube carried by said truss frame and indicating the level thereof.

3. A level indicator for tractors comprising: a horizontal pivot member on said tractor with its axis at right angles to the axis of said tractor; a truss frame hingedly mounted on said pivot member and extending forwardly of said tractor; a stub shaft at the forward extremity of said truss frame in axial alignment with said tractor; a hinge member rotatably mounted on said stub shaft; a truck frame hingedly mounted on said hinge member so that it will be free to tilt in every direction; caster wheels supporting said truck frame; and a liquid-containing U-tube carried by said truss frame and indicating the level thereof, said truck frame being triangular, said wheels being positioned at each corner thereof, with one of said wheels in alignment with the axis of said truss frame.

CARL HENRY BATTERMAN.